(12) United States Patent
Baumgarte et al.

(10) Patent No.: US 10,755,510 B2
(45) Date of Patent: *Aug. 25, 2020

(54) CREDENTIAL UPDATES IN AN OFFLINE SYSTEM

(71) Applicant: Schlage Lock Company LLC, Carmel, IN (US)

(72) Inventors: Joseph W. Baumgarte, Carmel, IN (US); Dennis T. Anfield, Carmel, IN (US); Jonathan R. Everson, Kokomo, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,360

(22) Filed: Oct. 22, 2019

(65) Prior Publication Data
US 2020/0193755 A1 Jun. 18, 2020

Related U.S. Application Data

(63) Continuation of application No. 15/798,736, filed on Oct. 31, 2017, now Pat. No. 10,453,279.

(51) Int. Cl.
| | | |
|---|---|---|
| G07C 9/27 | (2020.01) | |
| G06F 16/951 | (2019.01) | |
| G06F 21/44 | (2013.01) | |
| G07C 9/00 | (2020.01) | |
| G06F 16/25 | (2019.01) | |
| G06F 21/34 | (2013.01) | |
| G06F 21/45 | (2013.01) | |

(52) U.S. Cl.
CPC ............. *G07C 9/27* (2020.01); *G06F 16/252* (2019.01); *G06F 16/951* (2019.01); *G06F 21/34* (2013.01); *G06F 21/44* (2013.01); *G07C 9/00571* (2013.01); *G06F 21/45* (2013.01); *G07C 2009/0088* (2013.01); *G07C 2009/00873* (2013.01)

(58) Field of Classification Search
CPC ...................................................... G07C 9/27
See application file for complete search history.

(56) References Cited

U.S. PATENT DOCUMENTS

| | | | | |
|---|---|---|---|---|
| 7,280,030 | B1 * | 10/2007 | Monaco ................ | H04L 63/105 |
| | | | | 340/5.21 |
| 8,052,060 | B2 | 11/2011 | Yacoub et al. | |
| 8,150,374 | B2 * | 4/2012 | Lowe ..................... | G06F 21/31 |
| | | | | 455/411 |

(Continued)

FOREIGN PATENT DOCUMENTS

WO 2016202780 A1 12/2016

*Primary Examiner* — Qutbuddin Ghulamali
(74) *Attorney, Agent, or Firm* — Taft Stettinius & Hollister LLP

(57) ABSTRACT

A method according to one embodiment includes receiving, by an access control device, access control data from a server, storing the received access control data to a no tour database stored in a memory of the access control device, determining a credential device has been presented to a credential reader associated with the access control device, and transmitting the stored access control data to the credential device in response to determining the credential device has been presented to the credential reader and prior to communication with the server.

20 Claims, 7 Drawing Sheets

(56) References Cited

U.S. PATENT DOCUMENTS

| | | | | |
|---|---|---|---|---|
| 8,264,322 B2* | 9/2012 | Rodenbeck | ........ | G07C 9/00571 340/5.64 |
| 8,819,792 B2* | 8/2014 | Adams | ................ | H04W 12/003 726/6 |
| 9,024,720 B2* | 5/2015 | Bliding | ................... | H04W 4/80 340/5.61 |
| 9,641,335 B2* | 5/2017 | Bruce | ..................... | G06F 21/41 |
| 10,453,279 B2* | 10/2019 | Baumgarte | .............. | G07C 9/27 |
| 2008/0174403 A1* | 7/2008 | Wolpert | ................... | G07C 9/27 340/5.61 |
| 2015/0200925 A1* | 7/2015 | Lagerstedt | ...... | H04W 12/04031 726/6 |
| 2016/0371904 A1* | 12/2016 | Sinha | ....................... | G07C 9/28 |

\* cited by examiner

CREDENTIAL UPDATES IN AN OFFLINE SYSTEM

CROSS REFERENCE TO RELATED APPLICATIONS

The present application is a continuation of U.S. patent application Ser. No. 15/798,736 filed Oct. 31, 2017 and issued as U.S. Pat. No. 10,453,279, the contents of which are hereby incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device.

Credential management systems are often communicatively coupled to an access control device to manage various configuration data including, for example, user access permissions associated with various credentials. In order to update a credential itself, however, the credential is often physically returned to the office of the facility's access control manager in order to reprogram the credential. In other circumstances, the access control system may include "hotspot readers" that have direct connections to a back-end server such as the credential management system. As such, the hotspot reader is able to update the information on the credential while it is being presented to the reader by acting as a "pull" by which the reader notifies the credential management system that the credential is currently being presented to the reader and "pulls" the relevant credential information from the system in real-time to update the credential. Further, the management system may act as a "decision at host" system by which the access control device transmits credential information to the management system for authentication and the management system makes the access control decision.

"No tour" functionality allows access control managers use a credential enrollment reader, for example, to store configuration data (e.g., new access credentials) for an access control device onto a credential, which are provided to the target access control device(s) upon presentation of the credential to that device for configuration. As such, "no tour" functionality allows authorized credentials to be added to, or revoked from, an access control database of an access control device without requiring the access control manager or technician to visit the access control device herself (e.g., with a mobile device).

SUMMARY

According to an embodiment, a method may include receiving, by an access control device, access control data from a server, storing, by the access control device, the received access control data to a no tour database stored in a memory of the access control device, determining, by the access control device, a credential device has been presented to a credential reader associated with the access control device, and transmitting, by the access control device, the stored access control data to the credential device in response to determining the credential device has been presented to the credential reader and prior to communication with the server.

In some embodiments, the access control device may communicate with only the credential device from presentation of the credential device until transmission of the stored access control data. In some embodiments, receiving the access control data from the server may include receiving an identifier of the credential device to which the access control data is to be stored, and storing the received access control data may include storing the received access control data to the no tour database in association with the identifier. In some embodiments, determining the credential device has been presented to the credential reader may include determining the identifier of the credential device presented to the credential reader, and the method may further include determining whether the no tour database includes access control data in association with the identifier of the credential device presented to the credential reader. In some embodiments, the method may further include retrieving the access control data stored in association with the identifier of the credential presented to the credential reader, and transmitting the stored access control data may include transmitting the retrieved access control data. In some embodiments, the method may include determining whether the credential device presented to the credential reader is permitted access to a passageway controlled by the access control device based on the identifier. Further, determining whether the credential device presented to the credential reader is permitted access to the passageway may include performing a binary search for the identifier in an access control database different from the no tour database.

In some embodiments, the access control device is a first access control device, and the access control data identifies access permissions of one or more credential devices to a passageway controlled by an offline access control device different from the first access control device. In some embodiments, the access control data may be received from the server without transmission of a request for the access control data by the access control device. In some embodiments, the access control device may include the credential reader, and transmitting the stored access control data to the credential device may include transmitting the stored access control data via the credential reader of the access control device. In some embodiments, transmitting the stored access control data to the credential device may include transmitting the stored access control data via a credential reader communicatively coupled to the access control device. In some embodiments, the access control device may include one of an electronic lock or a peripheral controller of a door.

According to another embodiment, a system may include a credential reader, a passive credential device having a first credential identifier and configured to be powered by radio frequency signals received from the credential reader, a first access control device comprising a memory having a no tour database stored thereon, wherein the no tour database stores access control data in association with a corresponding credential identifier, and a management server configured to transmit access control data to the first access control device. Further, the first access control device may be configured to store the received access control data to the no tour database in association with the first credential identifier, receive the first credential identifier of the passive credential device from the credential reader in response to a user's presentation of the passive credential device to the credential reader, search the no tour database for the stored access control data based on the received first credential identifier, and transmit the access control data stored in the no tour database and identified in the search to the passive credential device.

In some embodiments, the system may further include an offline access control device having no communication connection with the management server, and the offline access control device may be configured to receive the access control data stored on passive credential device in response to a user's presentation of the passive credential device to another credential reader associated with the offline access control device and perform an update on the offline access control device based on the received access control data. In some embodiments, the update to the offline access control device may include an update to an access control database of the offline access control device. In some embodiments, the management server may be further configured to transmit an instruction to the first access control device to remove the access control data from the no tour database of the first access control device in response to transmittal of the access control data to the passive credential device. In some embodiments, the passive credential device may include one of a proximity card configured to communicate over a low frequency carrier frequency of nominally 125 kHz, or a smartcard configured to communicate over a high frequency carrier frequency of nominally 13.56 MHz. In some embodiments, the first access control device may include the credential reader. In some embodiments, the first access control device may include a peripheral controller communicatively coupled to the credential reader.

According to yet another embodiment, an access control device may include at least one processor and at least one memory comprising a no tour database and a plurality of instructions stored thereon that, in response to execution by the at least one processor, causes the access control device to receive a credential identifier from a server, store the received credential identifier to the no tour database, determine a credential device corresponding with the credential identifier has been presented to a credential reader associated with the access control device, and retrieve access control data associated with another access control device from the server and transmit the retrieved access control data to the credential device before loss of a communication connection between the credential device and the credential reader and in response to a determination that the credential device has been presented to the credential reader.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
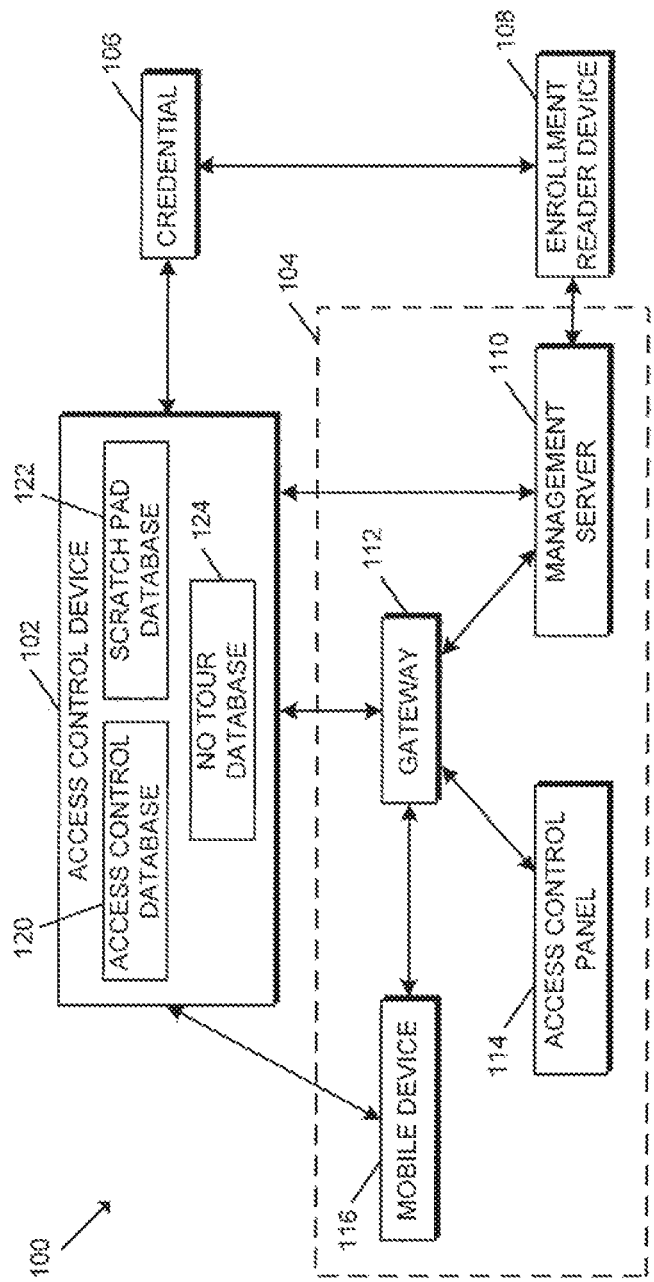
FIG. 1 is a simplified block diagram of at least one embodiment of an access control system for credential updates.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for credential updates includes an access control device 102, a management system 104, and a credential 106. Additionally, in some embodiments, the access control system 100 may include an enrollment reader device 108. Further, the management system 104 may include a management server 110, a gateway device, 112, an access control panel 114, and/or a mobile device 116.

As described in detail below, in the illustrative embodiment, the access control system 100 may utilize a real-time "push" architecture with a "decision at door" access control decision. Accordingly, in some embodiments, the management system 104 may always have access to update a database (e.g., an access control database 120) stored in the memory of the access control device 102, but the access control device 102 does not inform the management system 104 when the credential 106 has been presented to a reader of the access control device 102. When a credential is subsequently presented to the access control device 102 that received the update, the access control device 102 may store the update information on the access control device 102 (e.g., for subsequent transmittal to another access control device 102 in a "no tour" capacity). In other words, in some embodiments, the management system 104 can push an update to the access control device 102 so that if a credential 106 that requires an update is presented, the updated data can be quickly programmed to the credential 106 without the management system 104 requiring any direct or indirect real-time interaction with the credential 106. Further, in the illustrative embodiment, while the management system 104 may query the access control device 102 to determine which users/credentials were granted access and/or retrieve other audit data, the access control decisions are performed by the access control device 102.

It should be appreciated that an access control manager/technician may utilize an enrollment reader device 108, which communicates with the management system 104, to enroll a user and/or credential 106 into the access control system 100. In doing so, the management system 104 may establish various access permissions for that particular user/credential. For example, the credential 106 may have access to some access control devices 102 but not others. Further, in an offline system, for example, the management system 104 may leverage "no tour" functionality by storing credential information and/or other configuration data to the credential 106 such that the user may present the credential 106 to an access control device 102, which retrieves the data from the credential 106 and configured the access control device 102 accordingly (e.g., authorizing the credential 106 to access the access control device 102 and/or revoking access of previous credentials 106 to the access control device 102). Similarly, in an offline "push" access control system 100, the management system 104 may transmit access control data (e.g., credential information, configuration data, access control schedules, etc.) to an access control device 102, which may transfer the access control data to a corresponding credential 106 upon presentation of the credential 106 to a reader of the access control device 102 (e.g., for subsequent "no tour" presentation to yet another access control device 102).

By way of example, a building complex may have numerous access control devices 102 to manage access into various aspects of the building including the main entrance, gym, conference rooms, individual apartments, and/or other access-controlled areas. Some of those access control devices 102 may be online (e.g., the main entrance), whereas others may be offline (e.g., the gym). Suppose a user with access to the building complex purchased access to the gym, which has an offline access control device 102 with no communication connection with the management system 104. Based on the techniques described herein, the management system 104 may transmit the relevant access control data to one or more access control devices 102 with which the user is known to interact such as the main entrance. When the user subsequently presents her credential 106 to enter the main entrance of the building, that access control device 102 stores the access control data received from the management system 104 to the credential 106 during the brief interaction during which the communication connection is established between the credential 106 and the access control device 102. As such, the user is immediately able to go to the gym and, when presenting the credential 106 to the access control device 102 associated with the gym, that access control device 102 retrieves the access control data from the user's credential 106 and appropriately configures itself (e.g., to permit the user's access and/or otherwise modify the data stored thereon).

It should be appreciated that the access control device 102, the management system 104, the credential 106, the enrollment reader device 108, the management server 110, the gateway device 112, the access control panel 114, and/or the mobile device 116 may be embodied as any type of device or collection of devices suitable for performing the functions described herein. More specifically, in the illustrative embodiment, the access control device 102 may be embodied as any type of device capable of controlling access through a passageway. For example, in various embodiments, the access control device 102 may be embodied as an electronic lock (e.g., a mortise lock, a cylindrical lock, or a tubular lock) or a peripheral controller of a passageway. Depending on the particular embodiment, the access control device 102 may include a credential reader or be electrically/communicatively coupled to a credential reader configured to communicative with credentials 106. As shown in FIG. 1 and described in further detail below, the access control device 102 includes an access control database 120, a scratch pad database 122, and a no tour database 124. Although the databases 120, 122, 124 are described herein as separate databases, it should be appreciated that the associated content of those databases may form partitions of the same database in other embodiments. It should be further appreciated that each of the databases 120, 122, 124, or the singular database as the case may be, may be embodied as any type of data structure(s) consistent with the functions described herein.

In the illustrative embodiment, one or more of the credentials 106 is embodied as a passive credential device having a credential identifier (e.g., a unique ID) stored therein and is "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz. However, it should be appreciated that, in other embodiments, each of the credentials 106 may be embodied as any type of passive or active credential device capable of performing the functions described herein.

As described herein, the management system 104 may be configured to manage credentials of the access control system 100. For example, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the access control device 102 is offline). As indicated above, in other embodiments, it should be appreciated that the access control device 102 may communicate with the devices of the management system 104 via one or more other suitable communication protocols.

It should be appreciated that each of the access control device 102, the management system 104, the enrollment reader device 108, the management server 110, the gateway device 112, the access control panel 114, and/or the mobile device 116 may be embodied as one or more computing devices similar to the computing device 200 described below in reference to FIG. 2. For example, in the illustrative embodiment, each of the access control device 102, the management system 104, the enrollment reader device 108, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one access control device 102, one management system 104, one credential 106, one enrollment reader device 108, one management server 110, one gateway device 112, one access control panel 114, and one mobile device 116 are shown in the illustrative embodiment of FIG. 1, the system 100 may include multiple access control devices 102, management systems 104, credentials 106, enrollment reader devices 108, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate credentials 106 in some embodiments.

Figure 2:
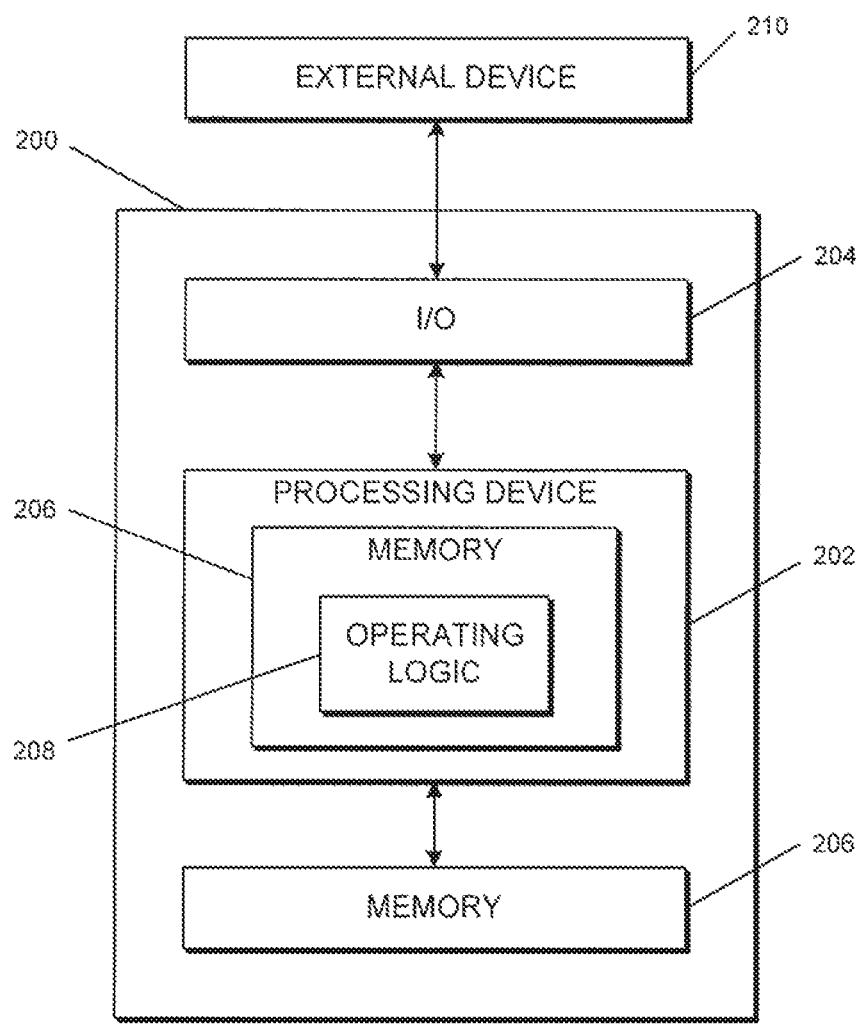
FIG. 2 is a simplified block diagram of at least one embodiment of a computing system.

Referring now to FIG. 2, a simplified block diagram of at least one embodiment of a computing device 200 is shown.

The illustrative computing device 200 depicts at least one embodiment of an access control device 102, management system 104, enrollment reader device 108, management server 110, gateway device 112, access control panel 114, and/or mobile device 116 illustrated in FIG. 1. Depending on the particular embodiment, computing device 200 may be embodied as a reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, DHMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the credential 106, the enrollment reader device 108, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
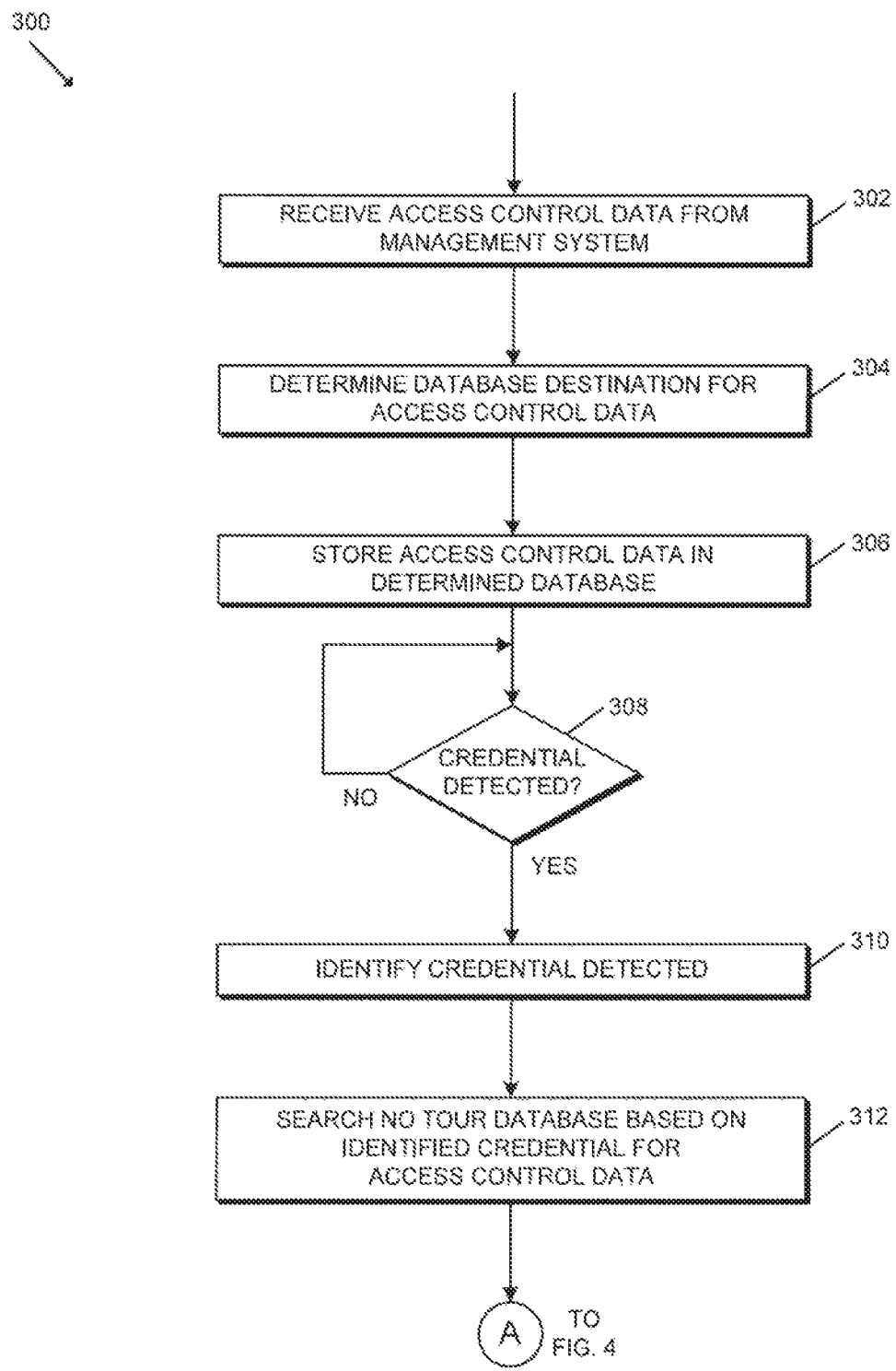
FIGS. 3-4 are a simplified flow diagram of at least one embodiment of a method for performing credential updates.
Figure 4:
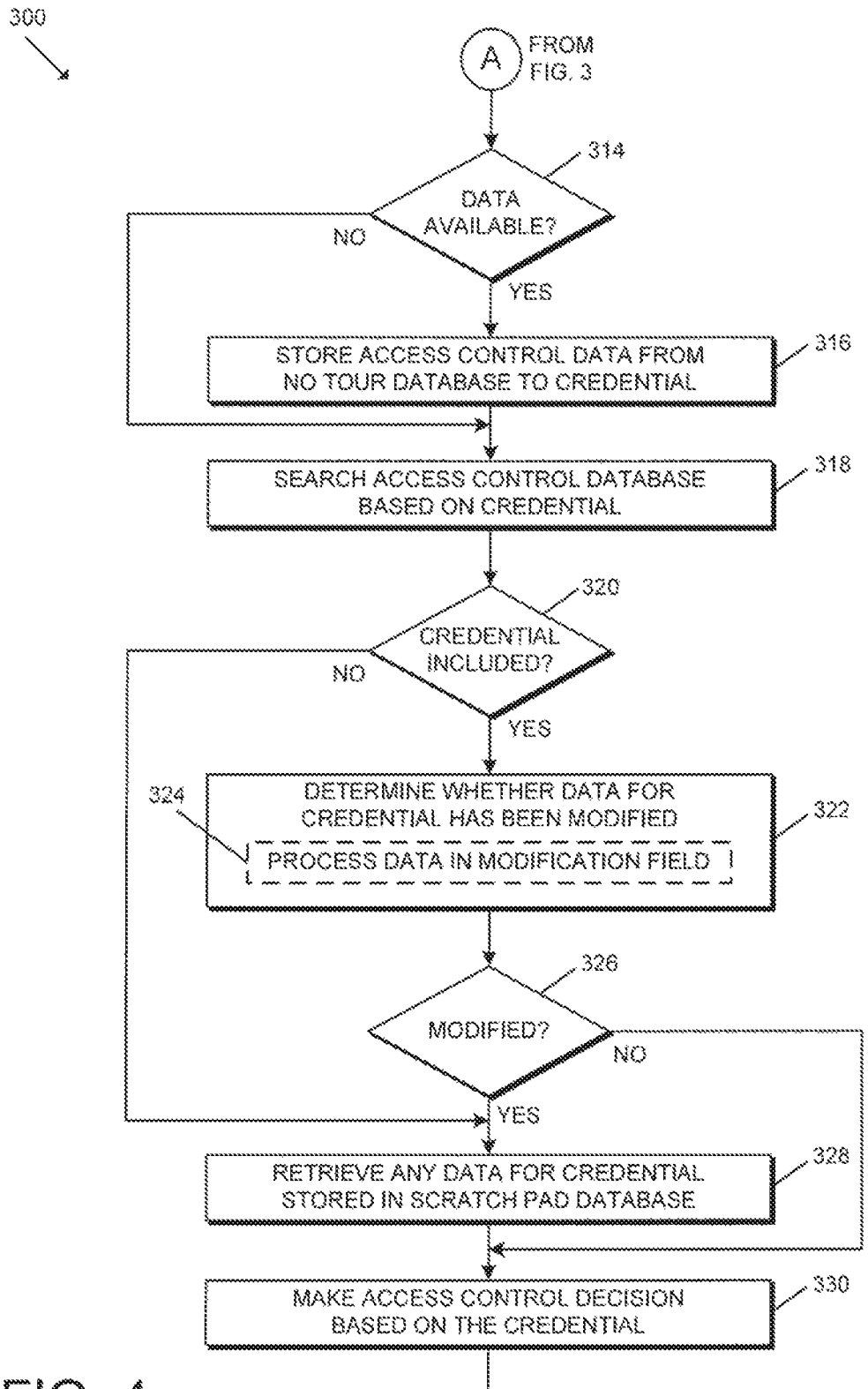

Referring now to FIGS. 3-4, in use, the system 100 or, more specifically, the access control device 102 may execute a method 300 for performing credential updates. It should be appreciated that the particular blocks of the method 300 are illustrated by way of example, and such blocks may be combined or divided, added or removed, and/or reordered in whole or in part depending on the particular embodiment, unless stated to the contrary. The illustrative method 300 begins with block 302 of FIG. 3 in which the access control device 102 receives access control data from the management system 104. It should be appreciated that the access control data may include credential information, configuration data, updated authorized credentials 106 for one or more access control devices 102, access control schedules, whitelists, blacklists, device parameters, and/or other suitable access control data. As described herein, in some embodiments, the access control data is data intended to be transmitted to an offline access control device 102 having no communication connection with the management system 104 for configuration thereof. As such, in some embodiments, the access control data may be transmitted to one or more credentials 106 for a subsequent "no tour" transmission to an access control device 102 (e.g., an offline access control device 102). In some embodiments, the access control data may include an identifier of the credential(s) 106 to which the access control data is to be stored. Additionally, the access control data may identify the access permissions of one or more users/credentials to a passageway controlled by the offline access control device 102 for which the access control data is intended.

In block 304, the access control device 102 determines the database destination for the access control data and, in block 306, stores the access control data in the determined database. In particular, in the illustrative embodiment, the access control device 102 determines whether to store the access control data in the access control database 120, the scratch pad database 122, or the no tour database 124. It should be appreciated that the access control device 102 may determine where to store the access control data based on the data itself, an indication of the appropriate database, and/or other factors. For example, if the access control data includes a full database update, the access control device 102 may overwrite the access control database 120. In some embodiments, it should be appreciated that the access control database 120 is sorted to permit a fast and efficient binary search of the database. However, if the access control data indicates that a particular user/credential is to be added or removed (or its access permissions modified), the access control device 102 may store the access control data to the scratch pad database 122, which may be unsorted and searched using, for example, a linear search. In yet another embodiment, if the access control data indicates that it is "no tour" data destined for a credential and/or other access control device 102, the access control device 102 may store the access control data to the no tour database 124. In particular, the access control data stored to the no tour database 124 may be stored in association with one or more credential identifiers of the credential(s) 106 to which the access control data is to be subsequently transferred.

In block 308, the access control device 102 determines whether a credential 106 has been presented to and detected by a credential reader associated with the access control device 102. As discussed above, in some embodiments, the access control device 102 may include the credential reader (e.g., in various embodiments in which the access control device 102 is an electronic lock), whereas in other embodiments, the access control device 102 may be separate from but electrically and/or communicatively coupled to the credential reader (e.g., in embodiments in which the access control device 102 is a peripheral controller of a door and/or the credential reader is a standalone reader). If the credential 106 has been detected, the method 300 advances to block 310 in which the access control device 102 identifies the credential 106 that has been detected. In particular, in some embodiments, the access control device 102 may determine one or more identifiers (e.g., unique identifiers) of the credential 106, for example, based on data retrieved from the credential 106 via the credential reader.

In block 312, the access control device 102 searches the no tour database 124 based on the identified credential 106 for any access control data to be transmitted to that credential 106 (e.g., based on the credential identifier). In other words, the access control device 102 determines whether any access control data is stored in association with the credential identifier in the no tour database 124. In some embodiments, it should be appreciated that the no tour database 124 is sorted (e.g., by the credential identifiers) such that a binary search and/or other similarly efficient search (e.g., a search that runs at worst in logarithmic time) may be performed on the no tour database 124 during the query.

If the access control device 102 determines, in block 314 of FIG. 4, that access control data associated with the credential 106 is stored in the no tour database 124, the method 300 advances to block 316 in which the access control device 102 stores the corresponding access control data from the no tour database 124 to the credential 106. More specifically, the access control device 102 retrieves the access control data stored in association with the identifier of the credential 106 presented to the credential reader and transmits/stores that access control data to the credential 106 (e.g., for subsequent transmittal to another access control device 102 in a "no tour" capacity). In the illustrative embodiment, it should be appreciated that the access control system 100 is embodied as a "push" system such that the access control device 102 does not prompt the management system 104 when the credential 106 is detected. Instead, in the illustrative embodiment, the access control device 102 functions in a "decision at door" capacity. Accordingly, it should be appreciated that the access control data may be retrieved from the memory of the access control device 102 and stored to the credential 106 without any interaction between the access control device 102 and the management system 104. In some embodiments, the access control device 102 communicates with only the credential 106 from the time the credential 106 is presented to the credential reader until the time the access control data is transmitted to the credential 106.

Regardless of whether the access control device 102 identified any access control data in the no tour database 124 for transmittal to the credential 106 presented to the credential reader associated with the access control device 102, the access control device 102 proceeds to determine whether the user associated with the credential 106 is authorized to access the passageway controlled by the access control device 102. Accordingly, the method 300 advances to block 318 in which the access control device 120 searches the access control database 120 based on the identified credential 106 (e.g., based on the credential identifier) to determine whether the credential 106 or, more specifically, the credential identifier is included in the access control database 120. As described above, in some embodiments, the access control database 120 is sorted (e.g., by the credential identifiers) such that a binary search or similarly efficient search may be performed on the access control database 120 during the query.

If the access control device 102 determines, in block 320, that the credential 106 (or the credential identifier) is included in the access control database 120, the method 300 advances to block 322 in which the access control device 102 determines whether the access control data for the credential 106 has been modified relative to the access control database 120 (e.g., subsequent to the last full update of the access control database 120). For example, in some embodiments, the access control database 120 indicates whether such a modification has occurred. More specifically, the access control database 120 may include a modification field (e.g., a bit, byte, flag, or other suitable identifier) for each credential entry that indicates whether a modification has occurred. Accordingly, in such embodiments, in block 324, the access control device 102 may process the data stored in the modification field. However, it should be appreciated that the access control database 120 may otherwise identify a modification in other embodiments. It should be appreciated that the access control database 120 may identify access control permissions for each of the credentials 106 authorized to access the passageway. Further, in some embodiments, the access control database 120 may include one or more blacklists or other data associated with access control.

If the access control device 102 determines, in block 326, that the access control data for the presented credential 106 has been modified or the access control device 102 determines, in block 320, that the credential 106 (or credential identifier) is not included in the access control database 120 at all, the method 300 advances to block 328 in which the access control device 102 retrieves any access control data associated with the credential 106 from the scratch pad database 122. In some embodiments, the scratch pad database 122 may be unsorted and/or the access control device 102 may search the scratch pad database 122 using a linear search or other similarly efficient search algorithm (e.g., a search that runs in at worst linear time). As described above, the scratch pad database 122 may be modified, for example, when a user/credential is granted access permissions to the access control device 102 (i.e., "added" to the access control device 102), revoked access permissions to the access control device 102 (i.e., "removed" from the access control device 102), and/or modified access permissions (e.g., changing the conditions under which access is permitted).

In some embodiments, when access control data associated with a credential 106 already identified in the access control database 120 is modified in the scratch pad database 122, the access control database 120 (e.g., the modification field) may be updated to provide notice of the modification. Accordingly, the scratch pad database 122 permits changes to the access control data associated with the access control device 102 without requiring a full database update of the access control database 120. As such, the access control device 102 searches the scratch pad database 122 to determine whether the credential 106 is newly added (e.g., if the credential 106 was not identified in the access control database 120) or whether the access permissions associated with the credential 106 have been revoked or otherwise modified (e.g., if the credential 106 was identified in the access control database 120 as having modified access control data). In some embodiments, it should be appreciated that the scratch pad database 122 may be omitted such that the access control device 102 relies exclusively on the access control database 120 with respect to access control decisions.

In block 330, the access control device 102 makes an access control decision based on the credential 106 and the access control data retrieved from the access control database 120 and/or the scratch pad database 122. In particular, the access control device 102 determines whether the user/bearer of the credential 106 presented to the credential reader associated with the access control device 102 is permitted access to the passageway controlled by the access control device 102 based on the credential identifier. If so, the access control device 102 may transmit one or more signals to control an electronic lock and/or other suitable access control mechanism(s). Otherwise, the access control device 102 may deny the user access to the passageway.

Although the blocks 302-330 are described in a relatively serial manner, it should be appreciated that various blocks of the method 300 may be performed in parallel in some embodiments.

Figure 5:
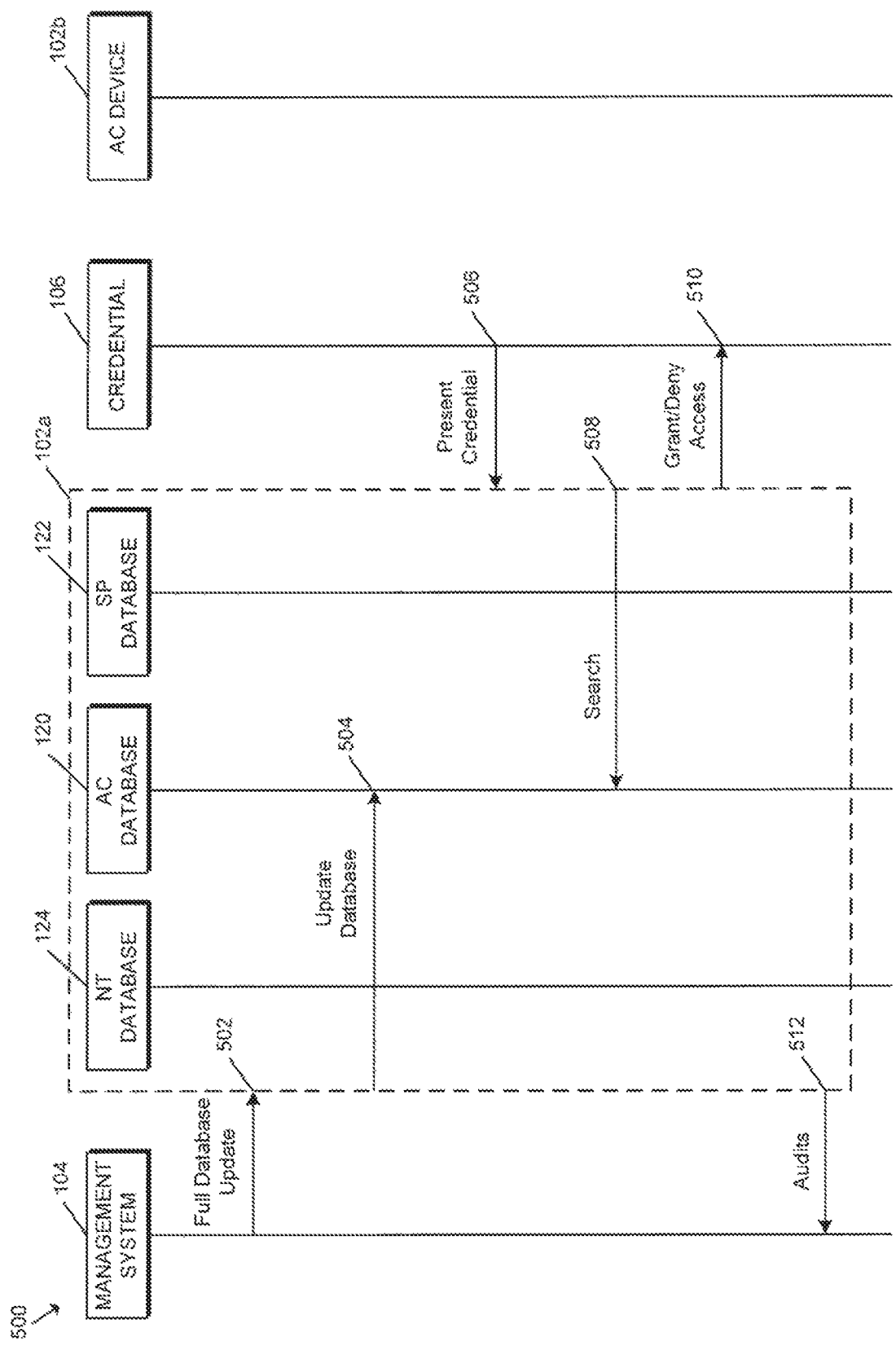
FIGS. 5-7 are simplified flow diagrams illustrating various data flows of the access control system of FIG. 1.
Figure 6:
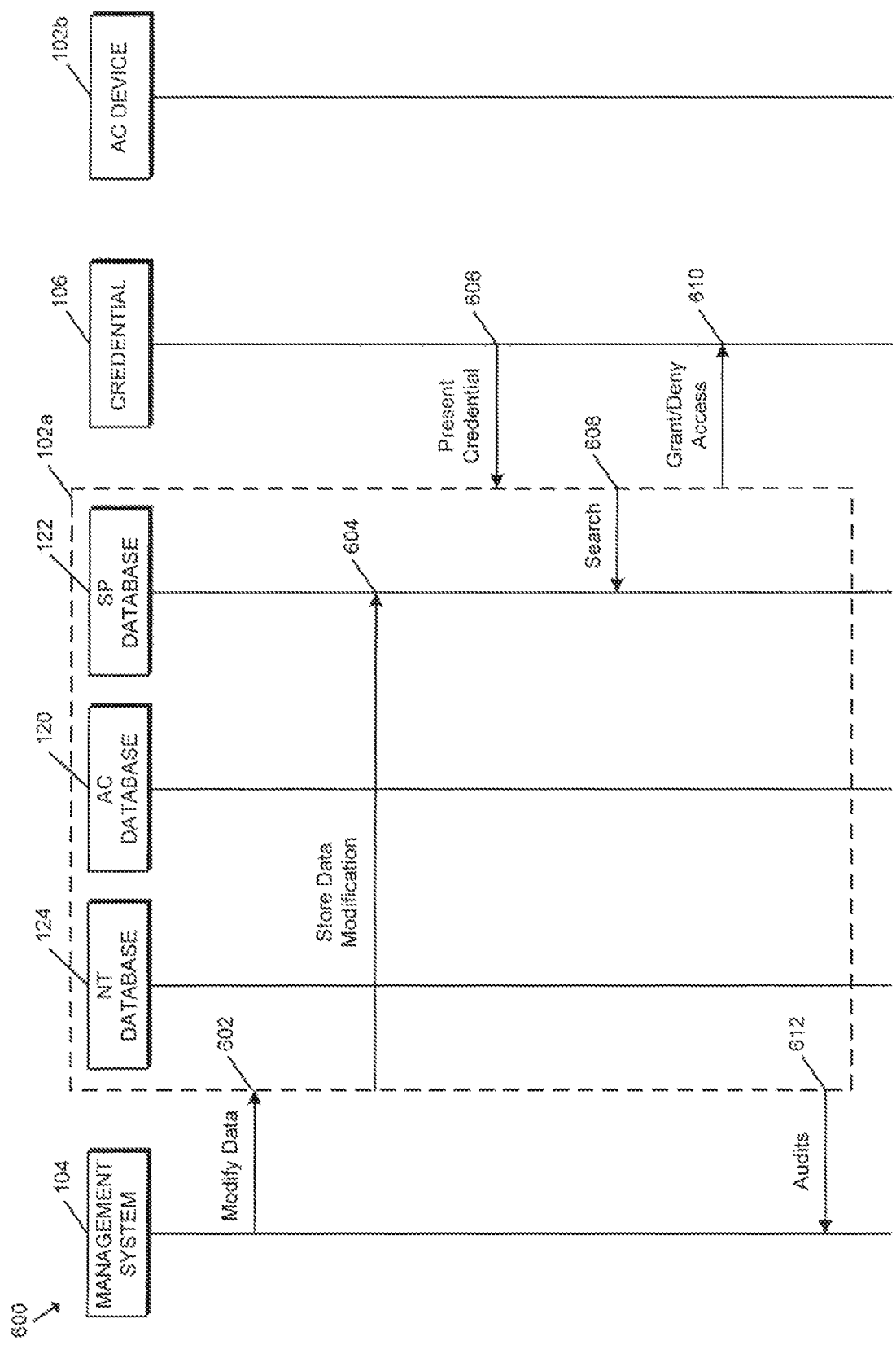
Figure 7:
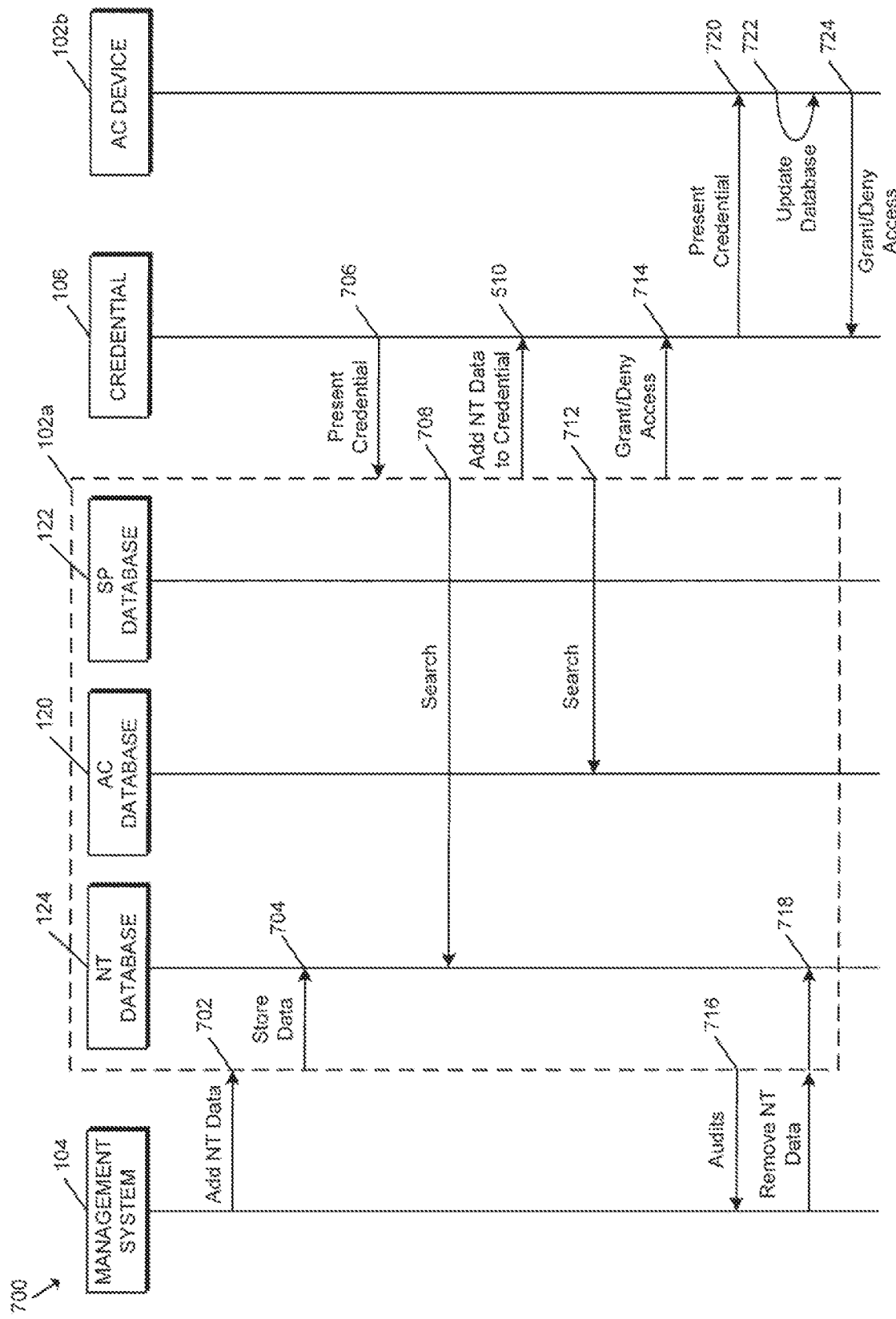

Referring now to FIGS. 5-7, in use, the access control system 100 may execute the methods 500, 600, 700, which depict various example data flows of the access control system 100. It should be appreciated that, in some embodiments, execution of the methods 500, 600, 700 may include execution of the method 300 of FIGS. 3-4. However, one or more the specific actions described above in reference to FIGS. 3-4 may be omitted from the description of the methods 500, 600, 700 for clarity of the description. Similarly, the description of the methods 500, 600, 700 themselves may omit one or more features not previously described in order to emphasize various aspects of the data flows of the access control system 100. As such, it should be appreciated that the particular data flows of the methods 500, 600, 700 are illustrated by way of example, and such data flows may be combined or divided, added or removed, and/or reordered in whole or in part depending on the particular embodiment, unless stated to the contrary.

Referring to FIG. 5, the illustrative method 500 begins with data flow 502 in which the management system 104 transmits a full database update to the access control device 102a. In data flow 504, the access control device 102a processes the database update request/instruction and determines that the full database update should be written to the access control database 120 of the access control device 102a (e.g., overwriting the entirety or a portion of the previous access control database stored thereon, if any). Subsequently, in data flow 506, a credential 106 is presented by a user to a credential reader associated with the access control device 102a. In response to the presentation of the credential 106, in data flow 508, the access control device 102a searches the access control database 120 for access control data associated with the credential 106 (e.g., based on a credential identifier) and, in data flow 510, the access control device 102a determines whether to grant or deny the user bearing the credential 106 access to a passageway controlled by the access control device 102a based on the retrieved access control data. In data flow 512, the access control device 102a may transmit audit data (e.g., credential granted/denied access and/or other suitable data) to the management system 104. In some embodiments, the access control device 102a may transmit the audit data, for example, when the access control device 120a subsequently establishes a communication connection with the management system 104 at a predefined time, or when the management system 104 establishes a communication connection with the access control device 102a to "push" additional data to the access control device 102a.

As described above, in some embodiments, the access control device 102a may also search the scratch pad database 122 and/or the no tour database 124. However, those features have not been described in reference to FIG. 5 for clarity of the description. Further, although the data flows 502-512 are described in a relatively serial manner, it should be appreciated that various data flows of the method 500 may be performed in parallel in some embodiments.

Referring to FIG. 6, the illustrative method 600 begins with data flow 602 in which the management system 104 transmits a modification to the access control data stored by the access control device 102a. For example, as described above, the modification may include authorizing a new user/credential to access the access control device 102a, revoking existing access permissions of a user/credential, and/or modifying existing access permissions. In data flow 604, the access control device 102a processes the modification update request/instruction and determines that it should be written to the scratch pad database 122. Subsequently, in data flow 606, a credential 106 is presented by a user to a credential reader associated with the access control device 102a. In response to the presentation of the credential 106, in data flow 608, the access control device 102a searches the scratch pad database 122 for access control data associated with the credential 106 (e.g., based on a credential identifier) and, in data flow 610, the access control device 102a determines whether to grant or deny the user bearing the credential 106 access to a passageway controlled by the access control device 102a based on the retrieved access control data. As described above, in some embodiments, the access control device 102a may first search the access control database 120 to determine whether access control data for the credential 106 is identified and, if not, or if the access control database 120 indicates that a modification to the access control data has occurred, the access control device 102a may search the scratch pad database 122 as described herein. In data flow 612, the access control device 102a may transmit audit data to the management system 104. As described above, in some embodiments, the access control device 102a may transmit the audit data, for example, when the access control device 102a subsequently establishes a communication connection with the management system 104 at a predefined time, or when the management system 104 establishes a communication connection with the access control device 102a to "push" additional data to the access control device 102a.

As described above, in some embodiments, the access control database 102a may also search the no tour database 124. However, those features have not been described in reference to FIG. 6 for clarity of the description. Although the data flows 602-612 are described in a relatively serial manner, it should be appreciated that various data flows of the method 600 may be performed in parallel in some embodiments.

Referring to FIG. 7, the illustrative method 700 begins with data flow 702 in which the management system 104 transmits "no tour" data to be added to the no tour database 124 of the access control device 102a. As described above, in the illustrative embodiment, the "no tour" data is access control data that is intended to be transmitted to a credential 106 for subsequent transmission to another access control device 102b, such as an offline access control device. In data flow 704, the access control device 102a processes the "no tour" data update request/instruction and determines that it should be written to the no tour database 124. Subsequently, in data flow 706, a credential 106 is presented by a user to a credential reader associated with the access control device 102a. In response to the presentation of the credential 106, in data flow 608, the access control device 102a searches the no tour database 124 to determine whether any "no tour" access control data is stored therein for transmission to the credential 106. If so, in data flow 510, the access control device 102a retrieves the "no tour" data and stores it to the credential 106. In other embodiments, it should be appreciated that the no tour database 124 may include a list of credential identifiers such that, when a credential 106 corresponding with one of those credential identifiers is presented to a credential reader associated with the access control device 102a, the access control device 102a establishes a communication connection with the management system 104 to receive data for transmission to the credential 106. In yet other embodiments, the access control device 102 may be configured (e.g., via a configuration flag) to establish such a communication connection regardless of the credential 106 presented.

In data flow 512, the access control device 102a searches the access control database 120 for access control data associated with the credential 106 (e.g., based on a credential identifier) and, in data flow 714, the access control device 102a determines whether to grant or deny the user bearing the credential 106 access to a passageway controlled by the access control device 102a based on the retrieved access control data. In data flow 716, the access control device 102a may transmit audit data (e.g., credential granted/denied access and/or other suitable data) to the management system 104 as described above. Further, in data flow 718, the management system 104 may transmit an instruction to the access control device 102a for the access control device 102a to remove the retrieved "no tour" data from the no tour database 124, which the access control device 102a executes. Additionally, in some embodiments, it should be appreciated that the management system 104 may have transmitted the same "no tour" data to multiple access control devices 102; accordingly, in such embodiments, the management system 104 may transmit the instructions to remove the "no tour" data from each of the corresponding access control devices 102. In data flow 720, the credential 106 may be subsequently presented to the access control device 102b for which the "no tour" data is intended and, in data flow 722, the access control device 102b may update one or more of its databases and/or other configuration data based on the "no tour" data. For example, in some embodiments, the "no tour" data may include an update to an access control database of the access control device 102b that defines various access control permissions of users/credentials to a passageway controlled by the access control device 102b. In data flow 724, the access control device 102b determines whether to grant or deny the user bearing the credential 106 access to the passageway controlled by the access control device 102b (e.g., based on access control data previously stored in an access control database of the access control device 102b and/or the "no tour" data transmitted to the access control device 102b).

As described above, in some embodiments, the access control device 102a and/or the access control device 102b may also search corresponding scratch pad databases 122. However, those features have not been described in reference to FIG. 7 for clarity of the description. Although the data flows 702-724 are described in a relatively serial manner, it should be appreciated that various data flows of the method 700 may be performed in parallel in some embodiments.

What is claimed is:

1. A method, comprising:
 receiving, by an access control device, access control data;
 storing, by the access control device, the received access control data to a no tour database stored in a memory of the access control device;
 determining, by the access control device, that a credential device has been presented to a credential reader associated with the access control device; and
 transmitting, by the access control device, the stored access control data to the credential device in response to the determining that the credential device has been presented to the credential reader and prior to communication with a server.

2. The method of claim 1, further comprising receiving an identifier of the credential device to which the access control data is to be transmitted; and
 wherein storing the received access control data comprises storing the received access control data to the no tour database in association with the identifier of the credential device to which the access control data is to be transmitted.

3. The method of claim 2, wherein the determining that the credential device has been presented to the credential reader comprises determining an identifier of the credential device presented to the credential reader; and
 further comprises determining whether the no tour database includes access control data in association with the identifier of the credential device presented to the credential reader.

4. The method of claim 3, further comprising retrieving the access control data stored in association with the identifier of the credential device presented to the credential reader; and
 wherein the transmitting the stored access control data comprises transmitting the retrieved access control data.

5. The method of claim 4, further comprising searching an access control database of the access control device based on the identifier of the credential device presented to the credential reader to determine access permissions of the credential device.

6. The method of claim 5, further comprising determining, by the access control device, whether the access control data associated with the credential device presented to the credential reader has been modified subsequent to a last update of the access control database based on a modification field identifier stored in association with the access control data for the credential device.

7. The method of claim 6, further comprising retrieving, by the access control device and from a scratch pad database, updated access control data associated with the credential device presented to the credential reader in response to determining that the access control data stored in the access control database has been modified.

8. The method of claim 7, wherein the no tour database is different from the access control database and the scratch pad database; and
 wherein the access control database is different from the scratch pad database.

9. The method of claim 1, wherein the credential device comprises a passive credential device.

10. The method of claim 9, wherein the passive credential device comprises one of:
 a proximity card communicating over a low frequency carrier frequency of nominally 125 kHz; and
 a smartcard communicating over a high frequency carrier frequency of nominally 13.56 MHz.

11. The method of claim 1, wherein the credential device comprises an active credential device.

12. An access control device, comprising:
 at least one processor; and
 at least one memory comprising a no tour database and a plurality of instructions stored thereon that, in response to execution by the at least one processor, causes the access control device to:
 receive access control data;
 store the received access control data to the no tour database;
 determine that a credential device has been presented to a credential reader associated with the access control device; and
 transmit the stored access control data to the credential device in response to a determination that the credential device has been presented to the credential reader and prior to communication with a server.

13. The access control device of claim 12, wherein the plurality of instructions further causes the access control device to receive an identifier of the credential device to which the access control data is to be transmitted; and
 wherein to store the received access control data comprises to store the received access control data to the no tour database in association with the identifier of the credential device to which the access control data is to be transmitted.

14. The access control device of claim 12, wherein to determine the credential device has been presented to the credential reader comprises to determine an identifier of the credential device presented to the credential reader; and
 wherein the plurality of instructions further causes the access control device to determine whether the no tour database includes access control data in association with the identifier of the credential device presented to the credential reader.

15. The access control device of claim 14, wherein the plurality of instructions further causes the access control device to retrieve the access control data stored in association with the identifier of the credential device presented to the credential reader; and
 wherein to transmit the stored access control data comprises to transmit the retrieved access control data.

16. The access control device of claim 15, wherein the at least one memory comprises an access control database; and
 wherein the plurality of instructions further causes the access control device to search the access control database based on the identifier of the credential device presented to the credential reader to determine access permissions of the credential device.

17. The access control device of claim 16, wherein the plurality of instructions further causes the access control device to determine whether the access control data associated with the credential device presented to the credential reader has been modified subsequent to a last update of the access control database based on a modification field identifier stored in association with the access control data associated with the credential device.

18. The access control device of claim 17, wherein the at least one memory comprises a scratch pad database; and wherein the plurality of instructions further causes the access control device to retrieve, from the scratch pad database, updated access control data associated with the credential device presented to the credential reader in response to a determination that the access control data stored in the access control database has been modified.

19. The access control device of claim 12, wherein the credential device comprises a passive credential device.

20. The access control device of claim 12, wherein the credential device comprises an active credential device.

* * * * *